United States Patent [19]

Simokat

[11] 4,143,250
[45] Mar. 6, 1979

[54] TELEPHONE ISOLATION SYSTEM

[75] Inventor: Frank L. Simokat, Babylon, N.Y.

[73] Assignees: TII Corporation, Lindenhurst, N.Y.;

[21] Appl. No.: 749,610

[22] Filed: Dec. 13, 1976

[51] Int. Cl.² ............................................. H04B 3/46
[52] U.S. Cl. .............................. 179/175.3 R; 179/2 A
[58] Field of Search .................. 179/175.3 R, 175.3 F, 179/2 A; 340/160

[56] References Cited

U.S. PATENT DOCUMENTS

| | | | |
|---|---|---|---|
| 3,739,107 | 6/1973 | Spencer | 179/175.3 R |
| 3,773,986 | 11/1973 | Tremblay | 179/175.3 R |
| 3,867,588 | 2/1975 | Pickens et al. | 179/175.3 R |
| 3,909,538 | 9/1975 | Jacobson | 179/2 A |
| 3,912,882 | 10/1975 | Beerbaum | 179/2 A |
| 4,016,360 | 4/1977 | Cane | 179/2 A |
| 4,041,255 | 8/1977 | Cambridge et al. | 179/175.3 R |
| 4,054,759 | 10/1977 | McGrath et al. | 179/175.3 R |

Primary Examiner—Douglas W. Olms

Attorney, Agent, or Firm—Morgan, Finnegan, Pine, Foley & Lee; Morgan, Finnegan, Pine, Foley & Lee

[57] ABSTRACT

The system disclosed transiently disconnects a subscriber's telephone equipment and network from the service provider (e.g. telephone company) network for a predetermined period of time in response to a remote switching pulse to facilitate the execution of diagnostic measurements without the necessity of visiting the subscriber's premises. The disconnect action is carried out by a two stage solid state circuit incorporating gate controlled devices such as SCRs together with RC networks whereby a capacitance is charged in response to the remotely originated switching pulse and then discharges to energize a switching relay and to maintain it energized for a predetermined period. In the energized state the switching relay isolates the subscriber network and its equipment from the telephone company network to permit the diagnostic measurements. The circuit design also provides improved noise suppression, as well as protection against spurious switching and certain overvoltage conditions. A modified version also provides means for detecting certain tip short conditions.

3 Claims, 3 Drawing Figures

TELEPHONE ISOLATION SYSTEM

BACKGROUND

The proliferation of customer owned telephone equipment and equipment ancillary thereto (e.g. burglar alarms, telephone answering devices, etc.) has increased the likelihood of malfunctions. As a consequence, the question of whether the fault is in the telephone company equipment and network or in the subscriber's equipment and network, is occurring with increasing frequency.

As a practical matter, the telephone company is required to bear the initial burden of isolating the fault whether it occurs in the company's equipment or in the subscriber's equipment. Often this entails a visit to the subscriber's premises.

To mitigate this burden apparatus has been proposed for isolating the telephone company network from the customer's equipment and lines by remote signalling from the central office so that tests can be conducted at the central office or other convenient locations to determine whether the fault lies with the subscriber's equipment or the utility's networks and equipment. Such a system is shown in the U.S. Pat. No. 3,725,613.

In that system an RC network is employed at the disconnect point between the phone company network and the subscriber's system. A remotely generated switching pulse charges the capacitor and initiates current through the coil of a switching relay the contacts of which provide the disconnect switching. The relay coil is maintained energized for a period after the termination of the switching pulse by reason of the discharge of the capacitor.

OBJECTS AND SUMMARY

The system herein is of the same general nature as the patented system but provides essential improvements in the system duty cycle and in noise immunity, and freedom from spurious switching. One embodiment also includes provisions for detecting tip shorts.

DRAWINGS

Serving to illustrate exemplary embodiments of the invention are the drawings of which:

FIG. 1 comprises a schematic circuit diagram illustrating one embodiment;

FIG. 2 is a timing diagram schematically indicating certain actions in the circuit of FIG. 1; and FIG. 3 is a schematic circuit diagram illustrating a modification of FIG. 1.

DETAILED DESCRIPTION OF THE INVENTION

Figure 1:
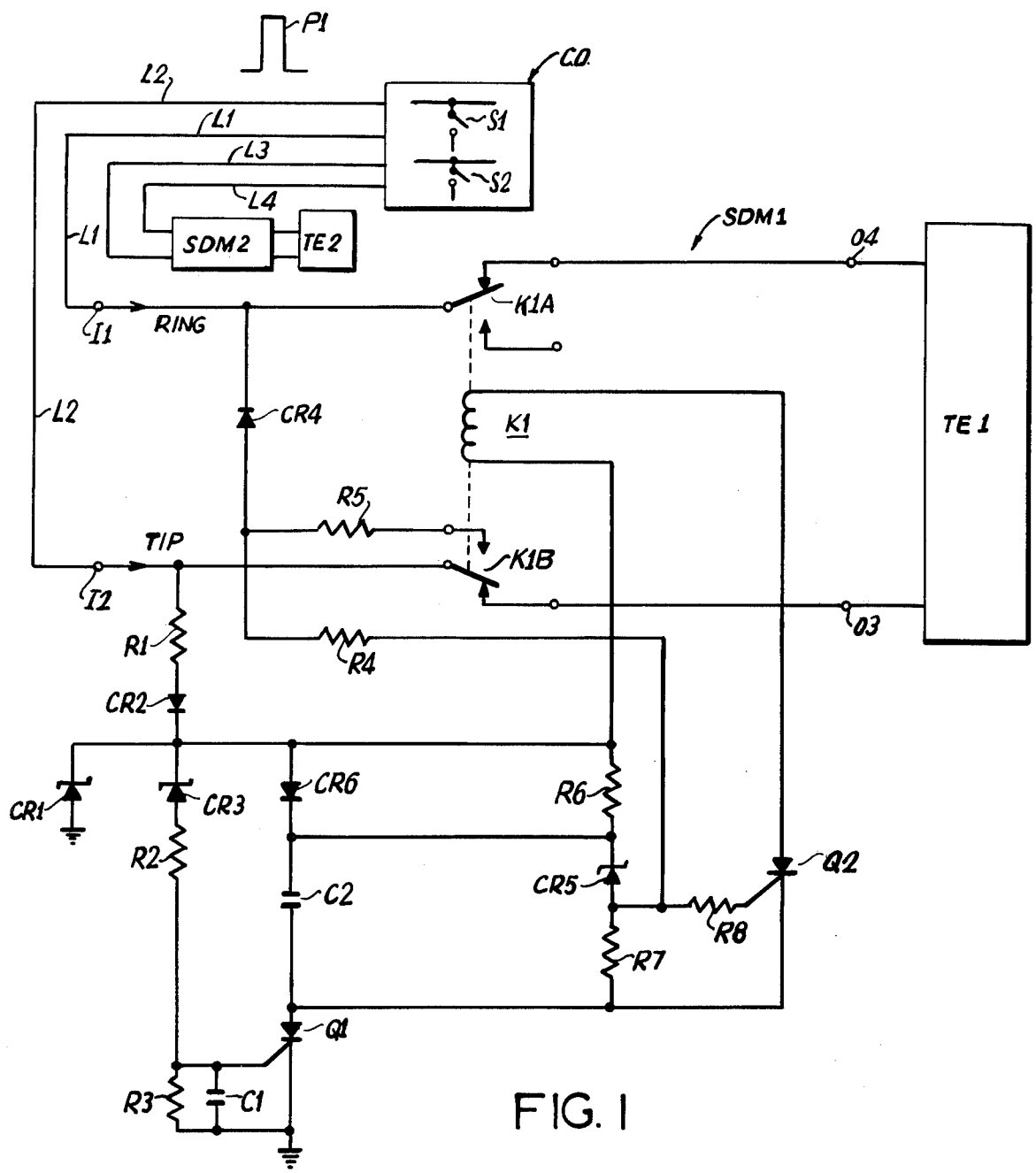

The switching module SDM1 illustrated in FIG. 1 is located between a pair of input terminals I1, I2 and a pair of output terminals 03 and 04. Telephone lines L1 and L2 from a central office CO are connected to the input terminals I1 and I2 respectively while output terminals 03 and 04 of the switching module are connected to the subscriber's telephone equipment TE 1. In the illustrated embodiment, line L1 represents the ring line while L2 is the tip side of the network. Also illustrated is another subscriber link involving phone company lines L3, L4, a second subscriber's system TE2, and a second disconnect module SDM2 interconnecting the lines and equipment.

Referring to SDM1, its input terminal I1 is normally connected to output terminal 04 via the normally closed contacts K1A of relay K1. Similarly, tip terminal I2 is connected to output terminal 03 via normally closed contacts K1B of the same relay. Consequently, in the normal state shown, the central office is connected to the subscriber's telephone equipment TE1 in the usual manner.

As is evident from an inspection of the circuit, the energization of relay K1 causes the normally closed contacts K1A and K1B to open thereby disconnecting the equipment TE1 from the telephone lines L1, L2. At the same time there is connected across the latter the series combination of a resistor R5 and diode CR4 to provide a known, polarity sensitive termination which may be measured at CO or at another remote point to verify the disconnect action.

The means for energizing the relay K1 to effect this switching will now be described. First, it may be noted that in normal operation lead L1 carries a negative voltage, e.g. —48 volts DC, relative to tip lead L2, the latter being nominally at ground potential (excluding induction and other noise voltages).

To energize relay K1 a positive pulse P1 is applied to line L2 at the central office CO, being approximately 130 volts peak relative to ground in the illustrated embodiment and of 1 to 2 seconds duration. Switch S1 schematically indicates one means for applying the pulse.

The appearance of the switching pulse at terminal I2 causes zener diode CR3 to break down. This diode is in a circuit connected from the gate of an SCR designated Q1 to the tip terminal I2, this circuit comprising the series combination of resistor R1, diode CR2, the zener diode CR3 and a resistor R2. Connected between the gate and cathode of Q1 is the parallel combination of a resistor R3 and capacitor C1. The latter, with R2, forms a relatively long time constant filter. Thus, most transients which may break down CR3 will not cause tip grounding with its associated noise.

With CR3 conducting as a consequence of switching pulse P1, gate-cathode current flows in Q1. Further, the switching pulse is also coupled to the anode of Q1 via R1, CR2, CR6 and C2.

With Q1 switched on the switching pulse appearing at tip terminal I2 thus causes a charging current to flow through a capacitor C2 as follows: from the tip terminal I2 through R1, CR2, CR6, C2 and the anode-cathode circuit of the SCR. Since R1 is of relatively low ohmage (620 ohms in the illustrated embodiment) as is the effective source impedance, it may be seen that C2 will charge rapidly.

As the charge of C2 increases, zener diode CR5 breaks down causing current flow through R7. The resultant voltage across that resistor energizes the gate-cathode circuit of the second controlled rectifier, Q2. When that occurs, C2 then commences to discharge through R6, relay coil K1 and the anode-cathode circuit of Q2, thus energizing relay K1 to initiate the disconnect switching previously described.

Since the discharge circuit has a relatively long time constant, R6 being approximately 13 K ohms in the illustrated circuit, relay K1 remains energized for a substantial period of time, e.g. approximately 25 seconds. Of course, the switching pulse is now terminated and Q1 has accordingly been switched off. The discharge continues even after CR5 cuts off; the relay K1 accordingly remains energized because Q2, being an SCR remains switched on notwithstanding its gate current ceases.

Figure 2:
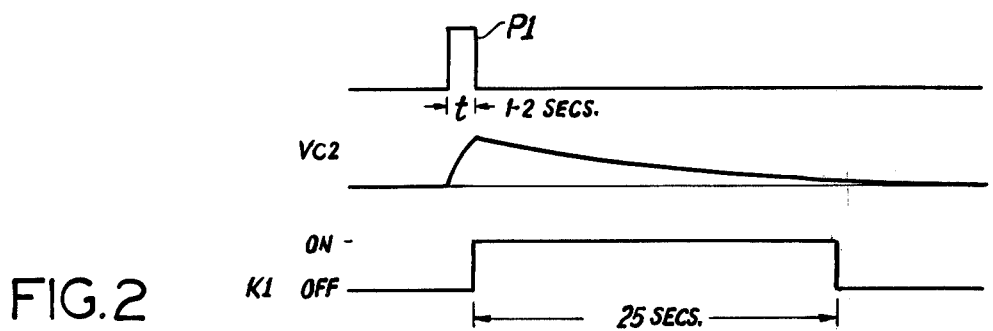

At the end of the disconnect interval, C2 is discharged to a point where the anode-cathode circuit of Q2 is no longer conductive. Consequently, coil current in K1 ceases, the relay deenergizes and normally closed contacts K1A and K1B return to the normally closed condition. When this occurs the connection from the telephone company's lines L1, L2 to the subscriber's equipment is restored. The overall duty cycle is schematically shown in FIG. 2 with the waveforms idealized.

During the period when the telephone equipment TE1 was disconnected, and following the termination of the short duration switching pulse P1 to line 12, testing equipment at the central office CO may be used to measure the impedance of the load connected across lines L1, L2. If that measurement indicates the presence of R5 and CR4, and if various tests indicate that there are no abnormal voltages (or currents) present in the network L1, L2, the testing indicates that the telephone company network is functioning satisfactorily and that any fault is with the subscriber's telephone equipment TE1.

In addition to the foregoing relay energizing and deenergizing circuits, the disconnect module also includes overvoltage protection in the form of zener diode CR1 which shorts the relay control circuits to ground in the event of an excessive voltage appearing at the tip terminal.

To achieve the required long time constant and satisfy other considerations as well, capacitance C2 must be of large value, being 100 microfarads in the illustrated embodiment. Practical capacitors having values in that range are of the type which are subject to degradation with time if they are not continuously polarized with a suitable voltage. To provide such a charge on C2 a charge path is provided from the tip terminal I2 through R1, CR2, CR6, C2, R7, R4 and CR4 to the ring terminal I1. As a consequence of this circuit, the normal battery voltage appearing between tip and ring produces a constant charge on capacitor C2.

In normal operation, although the tip circuit is nominally at zero voltage, induction effects produce substantial voltages. Thus the triggering circuit must be designed to reject these voltages and other superimposed transients. The noise filtering improvements involving tip grounding have already been described. In addition, the circuit of FIG. 1, being a two stage system, is less vulnerable to spurious triggering of the switching relay; until Q2 is conductive, energizing current cannot flow through K1. Also, with CR3 rated above 100 volts, the test voltages employed in certain systems will not inadvertently trigger the switching action.

Exemplary values for the various components embodied in the circuit of FIG. 1 are as follows. Unless otherwise specified, resistor wattages are ¼ watts.

| | |
|---|---|
| R1 | 620 ohms, 3 watts |
| R2 | 20 K ohms |
| R3 | 6.2 K ohms |
| R4 | 390 K |
| R5 | 100 K |
| R6 | 13 K |
| R7 | 200 ohms |
| R8 | 2.7 K |
| C1 | 22 microfarads, 6 volts |
| C2 | 470 microfarads, 63 volts |
| CR1 | 1N5380A (120 v, 5 w) |
| CR2 | 1N4007 |
| CR3 | 1N986B, 105 ± 5 v, 400 mw (selected) |

-continued

| | |
|---|---|
| CR4 | 1N4007 |
| CR5 | 1N983A |
| CR6 | 1N4004 |
| Q1, Q2 | SCR - CR45033 (Transitron) |
| Relay K1 | PB type, R50E0231-2, double pole, double throw relay |

In the event of a tip ground malfunction in the communication link, the switching Pulse P1 will be ineffective to produce the disconnect switching action.

Figure 3:
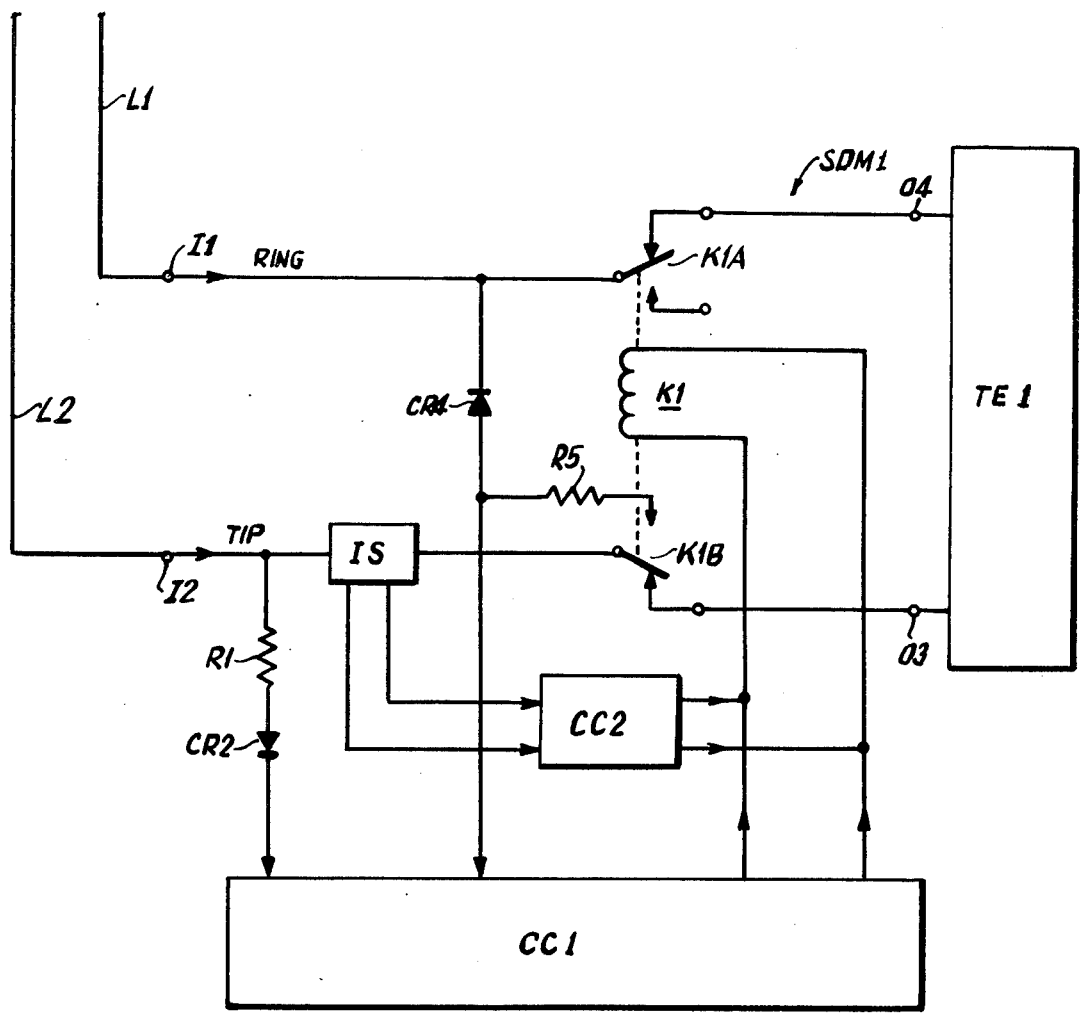

To facilitate detection of this condition the circuit of FIG. 1 may be modified as shown in FIG. 3. That circuit is identical to the FIG. 1 circuit except for the addition of a current sensor IS and a second control circuit CC2 which parallels the control circuit of FIG. 1 (designated CC1 for convenience).

In the event of a failure to disconnect, the central office or other remote monitoring point can apply a test voltage to the line L1, L2. This voltage has a magnitude, polarity and duration such that, with the top circuit grounded in either the disconnect module or subscriber's side thereof, the current in the tip lead, and through the current sensor IS, will exceed a certain predetermined value. When this occurs, the sensor, which may be a low ohmic serial resistance, will supply a switching voltage to the control circuit CC2; in response the latter will energize K1 causing disconnect. The resultant detection of termination CR4-R5 will indicate a grounded tip circuit malfunction on the downstream side of IS.

What is claimed is:

1. For use in a system between a communication provider and a subscriber of the type which includes a provider network and a respective subscriber network, and wherein said provider network includes means for transmitting diagnostic switching signals to said subscriber network, an isolation system for responding to said disagnostic switching signals to transiently disconnect said subscriber network from said provider network, said isolation system comprising:
    (1) switching means connecting said provider network to said subscriber network in one state and disconnecting said networks in a second state;
    (2) a first switch control circuit connected to said provider network and having (a) pulse responsive means connected to respond to a short duration diagnostic switching signal, and (b) energy storage means responsive to said pulse responsive means;
    (3) a second switch control circuit including a controlled rectifier having a control circuit connected to be responsive to said energy storage means and an output circuit connected to control actuation of said switching means; and (4) a charge circuit connected to said energy storage means for maintaining a charge on said energy storage means during periods when said networks are interconnected.

2. For use in a system between a communication provider and a subscriber of the type which includes a provider network and a respective subscriber network and wherein said provider network includes means for transmitting diagnostic switching signals to said subscriber network, a disconnect system for responding to said diagnostic switching signals to transiently disconnect said subscriber network from said provider network, said disconnect system comprising:
    (1) switching means normally connecting said provider network to said subscriber network in one state and disconnecting said networks in a second state, (2) switch control means including a capacitance discharge circuit connected to said switching means for controlling the state thereof, said capacitance discharge circuit having a time constant in excess of ten seconds, whereby said networks may be isolated from one another for substantial periods to facilitate diagnostic testing; and (3) a capacitance connected in said capacitance discharge circuit and means for maintaining a charge on said capacitance during periods when said networks are interconnected.

3. For use in a system between a communication provider and a subscriber of the type which includes a provider network and a respective subscriber network and wherein said provider network includes means for transmitting diagnostic switching signals to said subscriber network, a disconnect system for responding to said diagnostic switching signals to transiently disconnect said subscriber network from said provider network, said disconnect system comprising:

(1) switching means normally connecting said provider network to said subscriber network in one state and disconnecting said networks in a second state, and (2) switch control means including a capacitance discharge circuit connected to said switching means for controlling the state thereof, said switch control means includes a capacitance in said discharge circuit and further includes means connected to said provider network and said subscriber network for maintaining a charge of said capacitance during the periods when said networks are interconnected.

* * * * *